United States Patent
Jo et al.

(10) Patent No.: US 9,180,412 B2
(45) Date of Patent: Nov. 10, 2015

(54) METAL OXIDE ULTRAFINE FIBER-BASED COMPOSITE SEPARATOR WITH HEAT RESISTANCE AND SECONDARY BATTERY USING SAME

(75) Inventors: Seong Mu Jo, Seoul (KR); Dong Young Kim, Seoul (KR); Sung-Yeon Jang, Daegu (KR)

(73) Assignee: KOREAN INSTITUTE OF SCIENCE AND TECHNOLO

( * ) Notice: Subject to any disclaimer, the term of this patent is extended or adjusted under 35 U.S.C. 154(b) by 663 days.

(21) Appl. No.: 13/088,851

(22) Filed: Apr. 18, 2011

(65) Prior Publication Data

US 2012/0003524 A1   Jan. 5, 2012

(30) Foreign Application Priority Data

Apr. 19, 2010 (KR) .................... 10-2010-0035935

(51) Int. Cl.
*H01M 2/16* (2006.01)
*B01D 67/00* (2006.01)
(Continued)

(52) U.S. Cl.
CPC .......... *B01D 67/0013* (2013.01); *C04B 35/624* (2013.01); *C04B 35/6224* (2013.01); *C04B 35/62231* (2013.01); *C04B 35/62236* (2013.01); *C04B 35/62259* (2013.01); *C04B 35/62844* (2013.01); *C04B 35/63416* (2013.01); *D01D 5/003* (2013.01); *D01F 1/10* (2013.01); *D01F 6/12* (2013.01); *D01F 9/08* (2013.01); *H01M 2/145* (2013.01); *H01M 2/162* (2013.01); *H01M 2/1613* (2013.01); *H01M 2/1653* (2013.01); *H01M 2/1666* (2013.01);
(Continued)

(58) Field of Classification Search
USPC .................. 429/129, 246, 277, 251, 253, 254
See application file for complete search history.

(56) References Cited

U.S. PATENT DOCUMENTS

| 4,853,101 A * | 8/1989 | Hruska et al. ................. 204/296 |
| 6,447,958 B1 | 9/2002 | Shinohara |

(Continued)

FOREIGN PATENT DOCUMENTS

| CN | 1563522 A | 1/2005 |
| CN | 101161705 | 4/2008 |

(Continued)

OTHER PUBLICATIONS

Sigma_Aldrich catalog 2009 (p. 2222).*
(Continued)

*Primary Examiner* — Patrick Ryan
*Assistant Examiner* — Alex Usyatinsky (57) ABSTRACT

An ultrafine fiber-based composite separator comprising a fibrous porous body which comprises ultrafine metal oxide/polymer composite fibers, or ultrafine metal oxide fibers and a polymer resin coating layer formed on the surface thereof, the ultrafine fibers being continuously randomly arranged and layered, and obtained by electrospinning a metal oxide precursor sol-gel solution or a mixture of a metal oxide precursor sol-gel solution and a polymer resin solution, wherein the surface of the metal oxide/polymer composite fibers has a uniform mixing composition of the metal oxide and the polymer resin, in which the separator has a heat shrinkage rate at 150~250° C. of 10% or less and does not break down due to melting at a temperature of 200° C. or lower, has low heat shrinkage rate, and superior heat resistance and ionic conductivity, being capable of providing improved cycle and power properties when used in manufacturing a battery.

17 Claims, 9 Drawing Sheets (51) Int. Cl.

| | |
|---|---|
| *C04B 35/622* | (2006.01) |
| *C04B 35/624* | (2006.01) |
| *C04B 35/628* | (2006.01) |
| *C04B 35/634* | (2006.01) |
| *D01D 5/00* | (2006.01) |
| *D01F 1/10* | (2006.01) |
| *D01F 6/12* | (2006.01) |
| *D01F 9/08* | (2006.01) |
| *H01M 2/14* | (2006.01) |
| *H01M 10/052* | (2010.01) |

(52) U.S. Cl.
CPC ........ *B01D 2323/39* (2013.01); *B01D 2325/22* (2013.01); *C04B 2235/3203* (2013.01); *C04B 2235/3215* (2013.01); *C04B 2235/3218* (2013.01); *C04B 2235/3222* (2013.01); *C04B 2235/3234* (2013.01); *C04B 2235/3284* (2013.01); *C04B 2235/441* (2013.01); *C04B 2235/526* (2013.01); *H01M 10/052* (2013.01)

(56) References Cited

U.S. PATENT DOCUMENTS

| | | |
|---|---|---|
| 2005/0053840 A1 | 3/2005 | Jo et al. |
| 2006/0019154 A1 | 1/2006 | Imachi |
| 2010/0009267 A1* | 1/2010 | Chase et al. .................. 429/320 |

FOREIGN PATENT DOCUMENTS

| | | |
|---|---|---|
| CN | 101481855 | 7/2009 |
| CN | 102218271 | 10/2011 |
| JP | 2001/222988 | 8/2001 |
| JP | 2005/209570 | 8/2005 |
| JP | 2006-059717 | 3/2006 |
| JP | 2007-327148 | 12/2007 |
| KR | 1020090012726 | 2/2009 |
| KR | 2010-0035935 | 4/2010 |
| WO | WO 2005/057700 A1 | 6/2005 |
| WO | WO 2008018656 A1 | 2/2008 |
| WO | WO 2008018657 A1 | 2/2008 |

OTHER PUBLICATIONS

Doshi, "electrospinning Process and Applications of Electrospun Fibers", Journal of Electrostatics, Elsevier Science B.V., 35, 1995, 151-160.

Taylor, "Electrically Driven Jets" Proc. Roy. Soc. Lond., 313, Mar. 26, 1969, 453-475.

* cited by examiner

METAL OXIDE ULTRAFINE FIBER-BASED COMPOSITE SEPARATOR WITH HEAT RESISTANCE AND SECONDARY BATTERY USING SAME

FIELD OF THE INVENTION

The present invention relates to a metal oxide ultrafine fiber-based composite separator, which has low heat shrinkage rate, and superior heat resistance and ionic conductivity; and a secondary battery with high energy density and high capacity, which comprises same, thus exhibiting improved cycle and power properties.

BACKGROUND OF THE INVENTION

The current trend of requiring high performance, lightweight, and large battery for automobile power sources is accelerating demands on secondary batteries such as lithium ion secondary batteries, lithium ion polymer batteries and super-capacitors (including electric double-layer capacitors and pseudo-capacitors) having high energy density and high capacity.

However, conventional lithium ion secondary batteries using a polyolefin separator and a liquid electrolyte, as well as conventional lithium ion polymer batteries using a polymer electrolyte such as a gel polymer electrolyte membrane or a gel-coated polyolefin separator are very disqualified as high energy density and high capacity batteries in terms of heat resistance.

The separator, which is disposed between a cathode and an anode in a battery, functions to insulate these electrodes from each other, retains an electrolyte solution to provide a conduit for ionic conduction, and has a shutdown function, i.e., when the temperature of the battery increases excessively, the separator partially melts to close its pores, thereby blocking an electric current. When the temperature gets higher, the separator melts, and then a large hole is created, causing a short circuit between the cathode and the anode. This temperature is called a short circuit temperature. Generally, a separator should have a low shutdown temperature and a higher short circuit temperature. Further, a polyethylene separator shrinks at a temperature of 150° C. or higher, which results in exposure of parts of electrodes, undesirably causing a short circuit.

Therefore, in order to manufacture a high energy density and high capacity secondary battery, a separator is required, which exhibits a low heat shrinkage rate due to high heat resistance and also exhibits improved cycle performance due to high ionic conductivity.

As such a separator, US Patent Publication No. 2006/0019154 A1 discloses a polyolefin separator coated with a porous heat-resistant resin, which is manufactured by impregnating a polyolefin separator (air permeability of 200 sec/100 ml or less) in a solution of polyamide, polyimide or polyamideimide having a melting point of 180° C. or higher, and then immersing the resulting separator in a liquid coagulant, thereby removing a solvent therefrom by extraction.

Japanese Patent Laid-open Publication No. 2005-209570 discloses a polyolefin separator coated with a heat-resistant resin, which is manufactured by, in order to secure sufficient stability for high energy density and large battery with large capacity, coating both surfaces of a polyolefin separator with a heat-resistant resin solution such as an aromatic polyamide, polyimide, polyethersulfone, polyetherketone, and polyetherimide having a melting point of 200° C. or higher, and then subjecting the resulting separator to immersion in a liquid coagulant, water-washing and drying in order. Also, in this case, in order to reduce the deterioration of ionic conductivity, a phase separating agent for imparting porosity is added to the heat-resistant resin solution and the amount of coated heat-resistant resin is limited to 0.5~6.0 g/d.

However, immersion in the heat-resistant resin or coating therewith blocks the pores of the polyolefin separator and thus restricts movement of lithium ions, undesirably deteriorating charge-discharge properties. Even when the pore structure of the polyolefin separator is not closed, a polyolefin separator which is typically used has a porosity of about 40% and a pore size of several tens nm, and thus manifests an ionic conductivity that is insufficient for large-capacity batteries.

U.S. Pat. No. 6,447,958 B1 discloses a method for preparing a heat-resistant separator by coating porous woven fabric, nonwoven fabric, paper, or a porous film made of materials such as polyolefin, rayon, vinylon, polyester, acryl, polystyrene, nylon, etc., with a liquid slurry comprising a ceramic powder and a heat-resistant nitrogen-containing aromatic polymer, and then immersing the resulting product in a liquid coagulant, thus removing the solvent therefrom by extraction. However, this method is problematic because a series of processes are considerably complicated, which leads to high manufacturing cost.

Japanese Patent Laid-open Publication Nos. 2001-222988 and 2006-59717 disclose a method for preparing a heat-resistant electrolyte membrane which is manufactured by impregnating a support such as woven fabric, nonwoven fabric, cloth or a porous film of polyaramide or polyimide having a melting point of 150° C. or higher in a gel electrolyte of a polymer such as polyethylene oxide, polypropylene oxide, polyether and polyvinylidene, or by coating the support with the polymer gel electrolyte. In this case, however, movement of ions in the support or the heat-resistant aromatic polymer layer is still restricted as in the separator or the gel electrolyte of a conventional lithium ion battery.

International Publication No. WO 05/057700 A1 discloses a porous composite film manufactured by electrospinning a polymer solution containing solid particles including fine inorganic particles. However, non-uniformity of the polymer solution containing a high concentration of solid particles disadvantageously causes clogging of nozzles used in electrospinning and non-uniform distribution of agglomerated solid particles on the surface of ultrafine fibers generated by electrospinning, which brings out formation of defects in the composite film and lowering of a mechanical property. A battery comprising the porous composite film as a separator results in remarkably decreased electrochemical stability due to electrochemical instability of the exposed solid particles, as well as shows poor heat resistance.

As mentioned above, conventional separators or electrolyte membranes do not exhibit satisfactory heat resistance and ionic conductivity at the same time, and, therefore, they are difficult to be used in manufacturing a high energy density and high capacity battery.

SUMMARY OF THE INVENTION

It is, therefore, an object of the present invention to provide a separator which has low heat shrinkage rate, and superior heat resistance and ionic conductivity, being capable of providing improved cycle and power properties when used in manufacturing a battery, and a secondary battery comprising same.

In accordance with one aspect of the present invention, there is provided an ultrafine fiber-based composite separator comprising a fibrous porous body which comprises ultrafine metal oxide/polymer composite fibers, or ultrafine metal oxide fibers and a polymer resin coating layer formed on the surface thereof, the ultrafine fibers being continuously randomly arranged and layered, and obtained by electrospinning a metal oxide precursor sol-gel solution or a mixture of a metal oxide precursor sol-gel solution and a polymer resin solution, wherein the surface of the metal oxide/polymer composite fibers has a uniform mixing composition of the metal oxide and the polymer resin, in which the separator has a heat shrinkage rate at 150~250° C. of 10% or less and does not break down due to melting at a temperature of 200° C. or lower.

In accordance with another aspect of the present invention, there is provided a secondary battery comprising a cathode, an anode, and the ultrafine fiber-based composite separator and an electrolyte disposed between the two electrodes.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The ultrafine fibrous heat-resistant composite separator according to the present invention is characterized by comprising a fibrous porous body which comprises ultrafine metal oxide fibers, or ultrafine metal oxide fibers and a polymer resin coating layer formed on the surface thereof, the ultrafine fibers being continuously randomly arranged and layered, and obtained by electrospinning a metal oxide precursor sol-gel solution or a mixture of a metal oxide precursor sol-gel solution and a polymer resin solution, wherein the surface of the metal oxide/polymer composite fibers has a uniform mixing composition of the metal oxide and the polymer resin, in which the separator has a heat shrinkage rate at 150~250° C. of 10% or less and does not break down due to melting at a temperature of 200° C. or lower.

In the composite separator according to the present invention, the fibrous porous body comprising ultrafine fibers is manufactured by electrospinning the metal oxide precursor sol-gel solution or the mixture of the metal oxide precursor sol-gel solution and the polymer resin, thereby randomly arranging continuous ultrafine fibers to form a layer. Such ultrafine continuous fibers are formed by electrospinning the afore-mentioned solution through a nozzle under a high-voltage electric field, into continuous ultrafine fibers having a diameter ranging from several nm to several µm and a length ranging from several ten cm to several hundred m, unlike powdery metal oxide-based nanofibers, nanorods, nanotubes, nanoparticles and so on which are typically prepared using a chemical synthesis process. In the present invention, the porous body is formed by electrospun continuous fibers randomly arranged and layered.

Figure 1:
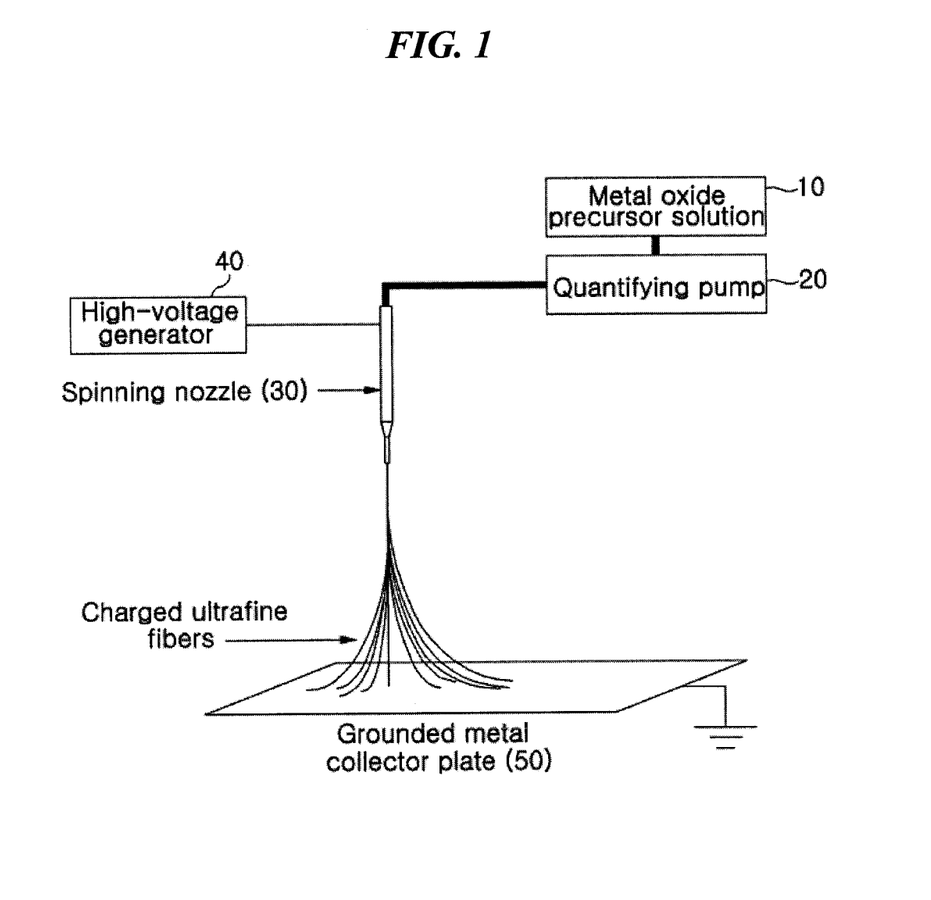
FIG. 1 illustrates a schematic view of an electrospinning device used in the present invention.

The principle of electrospinning to form ultrafine continuous fibers of metal oxide according to the present invention is well represented in various pieces of literature [G. Taylor. Proc. Roy. Soc. London A, 313, 453 (1969); J. Doshi and D. H. Reneker, J. Electrostatics, 35 151 (1995)]. As shown in FIG. 1, unlike electrostatic spray in which a low-viscosity liquid is sprayed in the form of ultrafine drops under a high-voltage electric field not lower than a critical voltage, the metal oxide precursor solution having sufficient viscosity is formed into ultrafine fibers under a high-voltage electrostatic force, which is called electrospinning. The electrospinning device includes a barrel (10) for storing a metal oxide precursor solution, a quantifying pump (20) for discharging the metal oxide precursor solution at a predetermined rate, and a spinning nozzle (30) connected to a high-voltage generator (40). The metal oxide precursor solution is discharged via the quantifying pump (20) in the form of ultrafine fibers while passing through the spinning nozzle (30) electrically charged by the high-voltage generator (40), and accumulates as porous ultrafine fibers on a grounded metal collector plate (50) in the form of a conveyor that moves at a predetermined rate (FIG. 1). When the metal oxide precursor solution is electrospun in this way, ultrafine fibers having a size ranging from several to several thousand nm may be produced and simultaneously may be fused and layered in a three-dimensional network structure, resulting in a desired porous web comprising metal oxide ultrafine fibers. This porous body comprising ultrafine fibers has a volume to surface area ratio much higher than that of conventional fibrous filters, and higher porosity.

According to the present invention, the average diameter of the fibers greatly affects the porosity and the pore size distribution of the separator. As the fiber diameter decreases, the pore size becomes smaller and the pore size distribution becomes narrower. Also, as the fiber diameter decreases, the specific surface area of the fibers increases, and thus the ability to retain an electrolyte solution is enhanced and the probability of leaking an electrolyte solution decreases. Thus, the diameter of the fibers of the metal oxide ultrafine fibrous porous body falls in the range of 1~3000 nm, preferably 1~1000 nm, and more preferably 50~800 nm. The porosity of the ultrafine fibrous separator may be 40~75%. If the porosity is less than 40%, ionic conductivity may decrease. In contrast, if the porosity exceeds 75%, the mechanical properties of the separator may deteriorate.

In the present invention, the metal oxide ultrafine fibers may be formed by using, broadening upon the concept of electrospinning mentioned above, melt-blowing, flash spinning, or electro-blowing which is a modification of these processes that uses a high-voltage electrical field and an air spray to manufacture ultrafine fibers. All of these methods have in common the concept of electrospinning including extrusion using a nozzle under an electric field, and thus electrospinning in the present invention includes all such methods.

More specifically, the ultrafine fibrous composite separator according to the present invention may be manufactured from (i) a porous body comprising ultrafine metal oxide/polymer composite fibers obtained by electrospinning the mixture of metal oxide precursor sol-gel solution and polymer resin solution (which is a method not using sintering), or (ii) a porous body comprising ultrafine metal oxide fibers having a polymer resin coating layer on the surface thereof obtained by sintering at 300~1000° C. a fibrous porous body resulting from electrospinning the metal oxide precursor sol-gel solution or the mixture of metal oxide precursor sol-gel solution and polymer resin solution (a first polymer resin solution), thus removing the polymer resin component therefrom, followed by impregnation or coating with a second polymer resin solution (which is a method using sintering).

The polymer resin used to manufacture the porous body comprising metal oxide/polymer composite fibers without sintering may include a polymer resin that has affinity for the electrolyte solution of a secondary battery and thus swells in the electrolyte solution, a heat-resistant polymer resin that has a melting point of 180° C. or higher or that does not melt, or a mixture thereof. The polymer resin that swells in an electrolyte solution is not particularly limited so long as it is electrochemically stable, and specific examples thereof may include polyvinylidene fluoride, poly(vinylidenefluoride-co-hexafluoropropylene), perfluoropolymers, perfluoropolymer copolymers, polyethyleneglycol derivatives such as polyethyleneglycol dialkylether and polyethyleneglycol dialkylester, polyoxides such as polyethylene oxide and polypropylene oxide, polyacrylonitrile, polyacrylonitrile copolymers such as polyacrylonitrile methylmethacrylate copolymers, polyurethanes, polymethylmethacrylate, polymethylmethacrylate copolymers, and a mixture thereof.

Also, specific examples of the heat-resistant polymer resin that has a melting point of 180° C. or higher or that does not melt may include polyamides, polyimides, polyamideimides, poly(meta-phenyleneisophthalamide), polysulfones, polyethersulfones, polyphenylenesulfones, polyetherketones, polyetherimides, aromatic polyesters such as polyethyleneterephthalate, polytrimethyleneterephthalate and polyethylenenaphthalate, polytetrafluoroethylene, polyurethanes, polyurethane copolymers such as polyetherurethanes, and a mixture thereof.

The polymer resin (a first polymer resin) used to manufacture the porous body comprising ultrafine metal oxide fibers having a polymer resin coating layer using sintering may include a polymer resin in which carbon components do not remain after sintering at 300~1000° C. Specific examples of this polymer resin include polyvinylpyrrolidone (PVP), polyvinylalcohol (PVA), polyvinylacetate (PVAc), polyethylene oxide (PEO), and a mixture thereof, but are not limited thereto.

After sintering, the polymer resin (a second polymer resin) used to impregnate or coat the ultrafine fibrous porous body may include a polymer resin that swells in an electrolyte solution, a heat-resistant polymer resin that has a melting point of 180° C. or higher or that does not melt, or a mixture thereof, and specific examples thereof are as listed above. The second polymer resin makes a binding force among the fibers of an ultrafine fibrous metal oxide porous support stronger, thereby improving a mechanical property of the composite separator, and also increases the ability to retain an electrolyte solution due to the polymer component having affinity therefor, thereby increasing the electrochemical stability. Conventionally, the heat-resistant composite separator is manufactured by subjecting the porous polyolefin film to a series of processes including impregnation in the polymer resin or coating with the polymer resin, immersion in a liquid coagulant such as water or an aqueous organic solvent solution to coagulate it, water-washing and then drying. However, the composite separator obtained by the conventional method undesirably has a closed pore structure. In contrast, according to the present invention, the porous body comprising metal oxide ultrafine fibers obtained using electrospinning has a very high porosity of 70~95% and an open pore structure, and thus the pores do not close in the course of binding by means of impregnation or coating using the polymer resin, thereby preventing performance of the separator from deteriorating.

The metal oxide precursor sol-gel solution used in the present invention contains a solvent such as water, alcohol or a mixture thereof, and is thus hydrophilic. The alcohol may include a lower alcohol having a low carbon number such as methanol, ethanol, propanol, butanol, etc. The polymer resin used in the present invention does not dissolve in water or alcohol, and the polymer resin solution contains an organic solvent such as dimethylformamide (DMF), dimethylacetamide (DMAc), dimethylsulfoxide (DMSO), acetone, tetrahydrofurane (THF), and a mixture thereof.

The mixture of metal oxide precursor sol-gel solution and polymer resin solution may form a homogeneous solution when the concentration of solid (the amounts of metal oxide and polymer resin) is low. In contrast, when the solid is present in a high concentration, phase separation occurs between the metal oxide sol-gel solution and the polymer resin solution, thus forming a heterogeneous solution. Ultimately, when the concentration of solid is too low or high, severe phase separation takes place. In both cases, it becomes difficult to form the fibers using electrospinning. In the case where the mixture solution is electrospun at room temperature, a solution having the solid in a concentration that enables the formation of fibers may be used. Even when a solution having a solid in as high a concentration as to cause phase separation at room temperature is used, increase in the temperature of the solution leads to increase in the solubility of solid as well as in the affinity between the metal oxide sol-gel solution and the polymer resin solution, which results in reduction of phase separation.

Hence, in the present invention, the electrospinning of the mixture of metal oxide precursor sol-gel solution and polymer resin solution may be preferably carried out at a temperature ranging from room temperature to 150° C. The metal oxide sol-gel reaction progresses excessively fast at a temperature higher than the above upper limit, which brings out precipitation of metal oxide particles and solidification of the solution making its electrospinning impossible.

The metal oxide precursor sol-gel solution is well mixed with the organic solvent of the polymer resin solution, but the polymer resin does not dissolve in the metal oxide precursor sol-gel solution. If the amount of metal oxide precursor sol-gel solution in the mixture thereof increases, precipitation of the polymer occurs. Thus, the amount of metal oxide may be preferably 5~80 wt %, more preferably 5~50 wt %, based on the weight of ultrafine metal oxide/polymer composite fibers.

In order to enhance the strength of the ultrafine fibrous separator, a binder for strengthening the binding among ultrafine fibers may be further dispersed in the ultrafine fibrous porous body. Such a binder may be introduced in the form of a binder dispersion through another spinning nozzle during the electrospinning, not through the spinning nozzle for the metal oxide precursor sol-gel solution or the mixture of such a sol-gel solution and polymer resin. Thereby, a porous body in which the binder is additionally dispersed and distributed between the ultrafine fibers may be obtained. Exemplary binders thereof may include chemically cross-linkable urethanes, thermoplastic resins, polytetrafluoroethylene and its derivatives, polyethylene, polypropylene, and low-melting-point polyesters, but are not limited thereto. Particularly useful is a resin which is electrochemically stable and has a high melting point.

The metal oxide precursor used in the present invention may be $M(OR)_x$, $MR_x(OR)_y$, $MX_y$, $M(NO_3)_y$, (M=metal including Si, Al, Zn, Li, Ti, Ba; R=alkyl group; X=F, Cl, Br, I; x and y=each independently an integer of 1~4), or a mixture thereof. Representative examples of the metal oxide include silica ($SiO_2$), alumina ($Al_2O_3$), boehmite, $ZnO_2$, $LiAlO_2$, $TiO_2$, $BaTiO_3$, $LiTiO_3$ and a mixture thereof, but are not limited thereto.

In order to form a separator which is flexible and has high heat resistance, the metal oxide precursor sol-gel solution used in the present invention may further comprise nanoparticles of metal oxide selected from the group consisting of silica ($SiO_2$), alumina ($Al_2O_3$), boehmite, $ZnO_2$, $LiAlO_2$, $TiO_2$, $BaTiO_3$, $LiTiO_3$, and a mixture thereof. The metal oxide nanoparticles are nano-sized powders such as nanorods, nanotubes, nanofibers, etc. The metal oxide nanoparticles may be used in an amount of 0.1~200 wt %, preferably 0.1~100 wt %, and more preferably 0.1~50 wt % based on the weight of the metal oxide obtained from the metal oxide precursor sol-gel solution. In the conventional technique using only a nano-sized powder form of the metal oxide nanoparticles, the nanoparticles are hardly uniformly dispersed in the polymer resin solution, undesirably making it difficult to manufacture ultrafine polymer fibers having high-concentration metal oxide nanoparticles and to ensure desired physical chemical properties of fibers attributable to heterogeneous dispersion.

The porous body comprising ultrafine fibers obtained using electrospinning according to the present invention typically has a high porosity of about 70~95%. Hence, in order to impart appropriate porosity and improve a mechanical property, heat compression; heat compression and then heat stretching; or a series of heat compression, heat stretching and then further heat compression may be performed, wherein the heat compression may be conducted at a temperature equal to or higher than the glass transition temperature ($T_g$) of polymer resin but equal to or lower than the melting point ($T_m$) thereof. Alternatively, after the heat compression or the heat stretching, heat treatment may be performed at 100~250° C. for a predetermined period of time, if necessary. By means of the heat compression and the heat stretching, the contained polymer component causes fusion between ultrafine fibers and orientation of the polymer chain, thus improving a mechanical property of the ultrafine fibrous porous body. The ultrafine fibrous porous body thus obtained has a porosity of 40~75%. In the case where a binder is contained, the fibers may be bound to each other by the above heat compression, resulting in formation of a porous body having a more improved mechanical property.

When the ultrafine fibrous composite separator according to the present invention, which includes the porous body comprising ultrafine metal oxide/polymer composite fibers or ultrafine metal oxide fibers having the polymer resin coating layer on the surface thereof, is kept at 150~250° C. for 1 hour or longer, it exhibits a low heat shrinkage rate of 10% or less. The inventive separator has good dimensional stability and thus does not break down due to melting at a temperature of 200° C. or lower. The heat resistance property of the composite separator is defined as a temperature at which a composite separator having a specific length extends and then breaks down due to melting while it is gradually heated under a predetermined load using a thermomechanical analysis (TMA) apparatus, which is referred to as high temperature melt integrity (HTMI).

Because the ultrafine fibrous composite separator according to the present invention has high air permeability and high porosity, it provides a battery having high ionic conductivity, and superior heat resistance and power properties. The ultrafine fibrous composite separator having a porosity of about 60% according to the present invention has a power property superior to that of a polyethylene separator having similar porosity, and thus exhibits a much higher power property compared to a heat-resistant separator obtained by coating the polyethylene separator with ceramic particles. Unlike the ultrafine fibrous porous body according to the present invention, in the case of a fibrous separator obtained by electrospinning the mixture solution of metal oxide fine particles and a polymer, the polymer melts to flow at a temperature equal to or higher than the melting point thereof, so that the fibrous structure does not maintain to break down, which makes it impossible to form the separator having high heat resistance.

In addition, the present invention provides a secondary battery including a cathode, an anode, and the ultrafine fiber-based composite separator and an electrolyte disposed between the two electrodes.

The secondary battery according to the present invention is manufactured by interposing the ultrafine fiber-based heat-resistant separator between a cathode containing a cathode active material and an anode containing an anode active material, laminating them, and injecting thereto an organic electrolyte solution, a polymer electrolyte or a solid electrolyte. Representative examples of the cathode active material include lithium cobalt composite oxide, lithium nickel composite oxide, nickel manganese composite oxide, a phosphate compound, and a mixture thereto. The anode active material is not particularly limited so long as it may be used for a non-aqueous electrolyte battery such as a lithium secondary battery, but representative examples thereof include a carbon material such as graphite and coke, tin oxide, metal lithium, silicon dioxide, titanium oxide, and a mixture thereof.

The kind of lithium salts contained in an organic electrolyte solution, a polymer electrolyte or a solid electrolyte is not particularly limited, and any lithium salt may be used so long as it is typically used in the field of lithium secondary batteries. Specific examples of the lithium salt may include $LiPF_6$, $LiClO_4$, $LiAsF_6$, $LiBF_4$, $LiCF_3SO_3$, $LiN(SO_2CF_3)_2$, $LiN(SO_2C_2F_5)_2$, $LiPF_{6-x}(C_nF_{2n+1})_x$ (1≤x≤6, n=1 or 2), and a mixture thereof. Among them, $LiPF_6$ is preferred. The concentration of the lithium salt may be 0.5~3.0 M, and 1 M organic electrolyte solution is mainly used.

As mentioned above, the inventive ultrafine fiber-based heat-resistant composite separator has low heat shrinkage rate, superior heat resistance and ionic conductivity, and high adhesion to electrodes, being capable of providing improved cycle and power properties when used in manufacturing a battery. Accordingly, it can be useful in fabricating a secondary battery having high energy density and high capacity.

The ultrafine fiber-based heat-resistant composite separator according to the present invention is particularly useful in the manufacture of electrochemical devices (secondary batteries including lithium ion secondary batteries, lithium ion polymer batteries, and super-capacitors) requiring high heat resistance and heat stability as do electric automobiles, hybrid electric automobiles, and fuel-cell automobiles.

The following examples may provide a better understanding of the present invention and provide an illustration thereof, but are not to be construed as limiting the present invention.

EXAMPLE

The properties of the separators manufactured in the examples and comparative examples and the properties of batteries including the same were measured using the following methods.

Porosity of Separator

The porosity of the separator was evaluated by the apparent porosity of Equation 1 below and by butanol impregnation as represented by Equation 2 below.

$$\text{Apparent Porosity}(\%)=\{1-(\rho_M/\rho_P)\}\times 100 \quad \text{Equation 1}$$

wherein $\rho_M$ is the density of a fiber layer, and $\rho p$ is the density of a polymer.

$$\text{Porosity}(\%)=\{(M_{BuOH}/\rho_{BuOH})/(M_{BuOH}/\rho_{BuOH}+M_m/\rho_P)\}\times 100 \quad \text{Equation 2}$$

wherein $M_{BuOH}$ is the weight of absorbed butanol, $M_m$ is the weight of a separator, $\rho_{BuOH}$ is the density of butanol, and $\rho_p$ is the density of a polymer.

Electrolyte Solution Absorption of Separator

A 3 cm×3 cm separator sample was immersed in a 1 M LiPF$_6$ EC/DMC/DEC(1/1/1) electrolyte solution at room temperature for about 2 hours, after which an excess of the electrolyte solution was removed from the surface of the sample using filter paper, and the sample was then weighed, thus determining the electrolyte solution absorption.

Heat Shrinkage Rate of Separator

A 3 cm×3 cm separator sample was allowed to stand at 150~250° C. for 1 hour, and the heat shrinkage rate thereof was then calculated.

Heat Resistance Property (High Temperature Melt Integrity) of Separator

As the heat resistance property of a separator, high temperature melt integrity (HTMI) was determined by measuring changes in length of a 1 cm×0.5 cm sample depending on changes in temperature in the temperature range of 50~400° C. using TMA (Perkin-Elmer, TMA-7). As such, the heating rate and the load were respectively 5° C./min and 200 g (electrostatic force: 50 mN).

Heat Resistance Property of Battery

After forming a cell comprising LiCoO$_2$//electrolyte solution-impregnated separator//MCMB, the battery was charged up to 50% SOC and then heated to 40~250° C. at a rate of 5° C./min. The 5-min stabilization time was interposed between intervals of 10° C. and impedance was then measured from 100 mHz to 1 MHz for 150 sec, after which OCV for 10 sec and impedance at 1 kHz for 10 sec were sequentially measured.

Electrochemical Stability of Separator

After forming a cell comprising stainless steel plate//electrolyte solution-impregnated separator//stainless steel plate, electrochemical stability of the separator was determined by subjecting the separator impregnated in a predetermined amount of electrolyte solution to linear sweep voltammetry. Furthermore, measurement was performed using a three-electrode electrochemical cell including a nickel working electrode, a lithium reference electrode and a count electrode at a scan rate of 1 mV/min in the range of 2~6 V (Li$^+$/Li) at room temperature by means of an electrochemical analyzer (CHI model 600).

Charge-Discharge Property of Battery

The charge-discharge property of a battery was measured by performing charge under conditions of a current density of 0.68 mA/cm$^2$ (0.2 C) and a fixed current and fixed voltage of 4.2 V using a battery cycler (WBCS 3000, WonA Tech Co.) and then discharge to 2.75 V under conditions of 3.4 mA/cm$^2$ (1 C). The charge-discharge cycle test was performed by measuring capacity % maintained up to 500 cycles at room temperature.

Power Property of Battery

The power property of a battery was evaluated by measuring hybrid pulse power characterization (HPPC). After forming a cell, the battery was charged up to 4.2 V under constant current/constant voltage, stabilized for 10 min, discharged to 10% SOC with 1 C, and then stabilized for 20 min. Subsequently, in order to measure discharge pulse power, the battery was discharged with 5 C for 10 sec and then stabilized for 40 sec. To measure regeneration pulse power, the battery was charged with 3 C for 10 sec. To perform subsequent measurement after measurement of the step 1, while the battery was discharged again with 1 C to 20% SOC, 30% SOC, 40% SOC, 50% SOC, 60% SOC, 70% SOC, 80% SOC, and 90% SOC, similar measurements were repeated.

Formation of Electrode

A cathode (available from SKC) obtained by casting a slurry (available from SKC) comprising a PVdF binder, super-P carbon, and LiCoO$_2$ (available from Japan Chemical) on aluminum foil was used, and an anode (available from SKC) obtained by casting a slurry comprising MCMB (available from Osaka Gas), a PVdF binder, and super-P carbon on copper foil was used. The theoretical capacity of this electrode was 145 mAh/g.

In order to enhance the force of adhesion between the particles and the metal foil upon fabrication of the cathode and the anode, the corresponding slurry was cast and then roll pressed so that the thickness of the electrode was about 50 μm.

Comparative Example 1

2 g of silica (available from Aldrich) was added to 38 g of dimethylformamide (DMF), and then dispersed for about 1 hour using an ultrasonic generator, after which 3.6 g of polyacrylonitrile (PAN, Mw 150,000, available from polyscience) was added thereto and stirred at 75° C. for 1 hour so that the PAN was dissolved, thus preparing a silica/PAN mixture solution. The mixture solution was electrospun using the electrospinning device of FIG. 1 (a high voltage electric field of 17 kV, the distance between a 27G spinning nozzle and a metal collector plate of 14 cm, a delivery rate of 30 μl/min), thus manufacturing SiO$_2$/PAN ultrafine fibers in which silica nanoparticles were dispersed in PAN. Also, using the same method, 38 g of DMF was mixed with 2 g of silica and 4 g of polyvinylidene fluoride (PVdF, Kynar 761), thus manufacturing $SiO_2$/PVdF ultrafine fibers in which silica was dispersed in PVdF.

In addition, using the same method, $TiO_2$/PVdF ultrafine fibers having respective weight ratios of $TiO_2$/PVdF of 1:2 and 1:1 were manufactured from titanium dioxide nanoparticles (P25, available from Degussa) and PVdF (Kynar 761).

Figure 2:
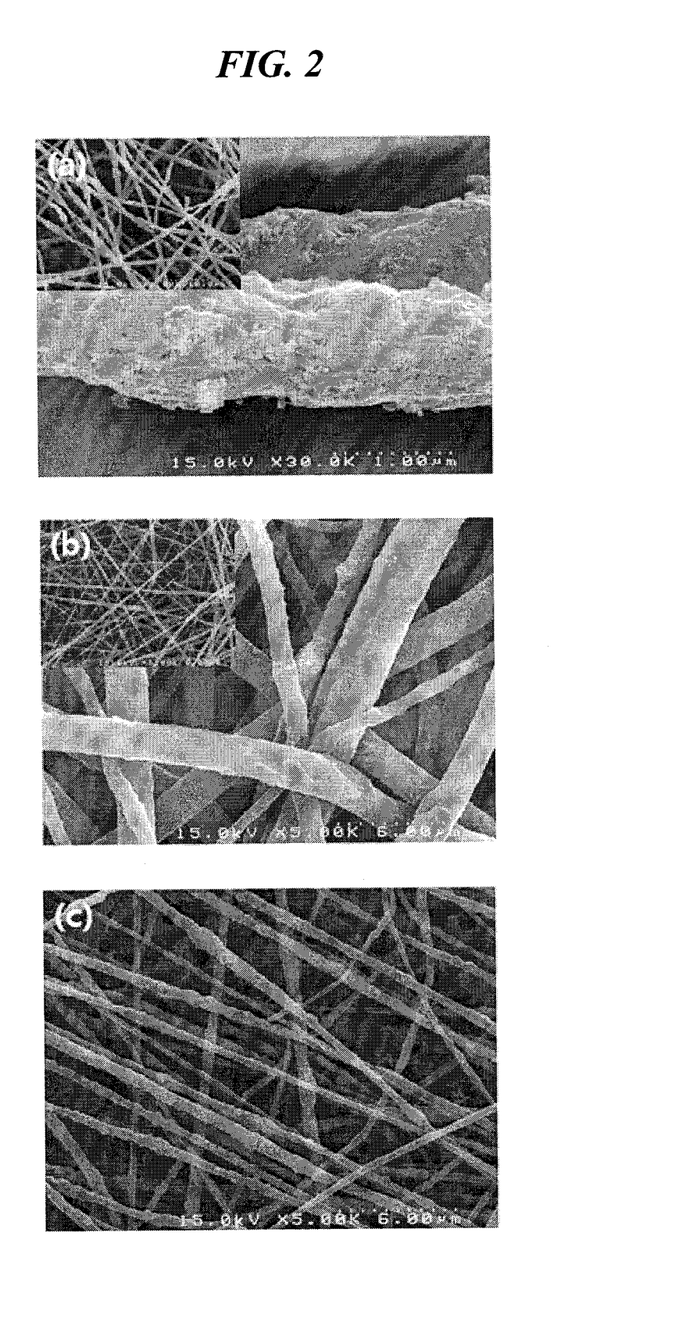
FIG. 2 depicts transmission electron microscope (TEM) images of metal oxide nanoparticle/polymer composite ultrafine fibers of Comparative Example 1, including (a) $SiO_2$/PAN (1/1.8 weight ratio), (b) $TiO_2$/PVdF (1:2 weight ratio), and (c) $TiO_2$/PVdF (1:1 weight ratio), respectively.

The TEM images of the $SiO_2$/PAN and the $TiO_2$/PVdF ultrafine fibers are shown in FIG. 2, in which (a) shows $SiO_2$/PAN (1/1.8 weight ratio) ultrafine fibers, (b) shows $TiO_2$/PVdF (1:2 weight ratio) ultrafine fibers, and (c) shows $TiO_2$/PVdF (1:1 weight ratio) ultrafine fibers. The metal oxide nanoparticles were mainly observed on the surface of the manufactured fibers, and the surface was very rough.

Figure 3:
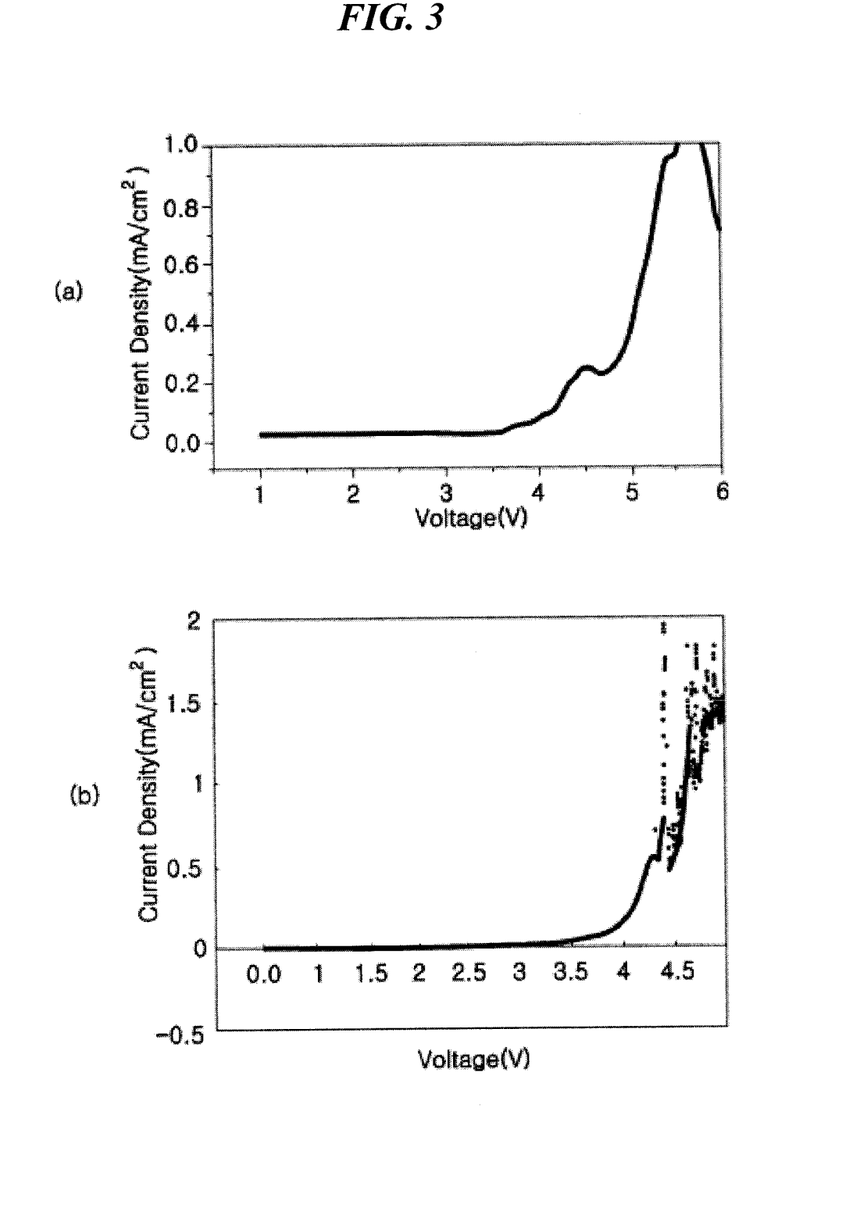
FIG. 3 shows results of measuring electrochemical stability of the metal oxide nanoparticle/polymer composite separators of Comparative Example 1, including (a) $SiO_2$/PVdF (1:2 weight ratio) and (b) $TiO_2$/PVdF (1:2 weight ratio), respectively.

The electrochemical stability of the $SiO_2$/PVdF and the $TiO_2$/PVdF ultrafine fibrous separators is shown in FIG. 3, in which (a) shows $SiO_2$/PVdF (1:2 weight ratio), and (b), $TiO_2$/PVdF (1:2 weight ratio). The $SiO_2$/PVdF and the $TiO_2$/PVdF ultrafine fibrous separators exhibited very poor electrochemical stability because the electrolyte solution decomposed at about 3.7 V. When 3 cm×3 cm samples thereof were allowed to stand at 180° C. for about 1 hour, the shrinkage rates thereof were 13.7% and 14.5%, respectively.

Example 1-1

Figure 4:
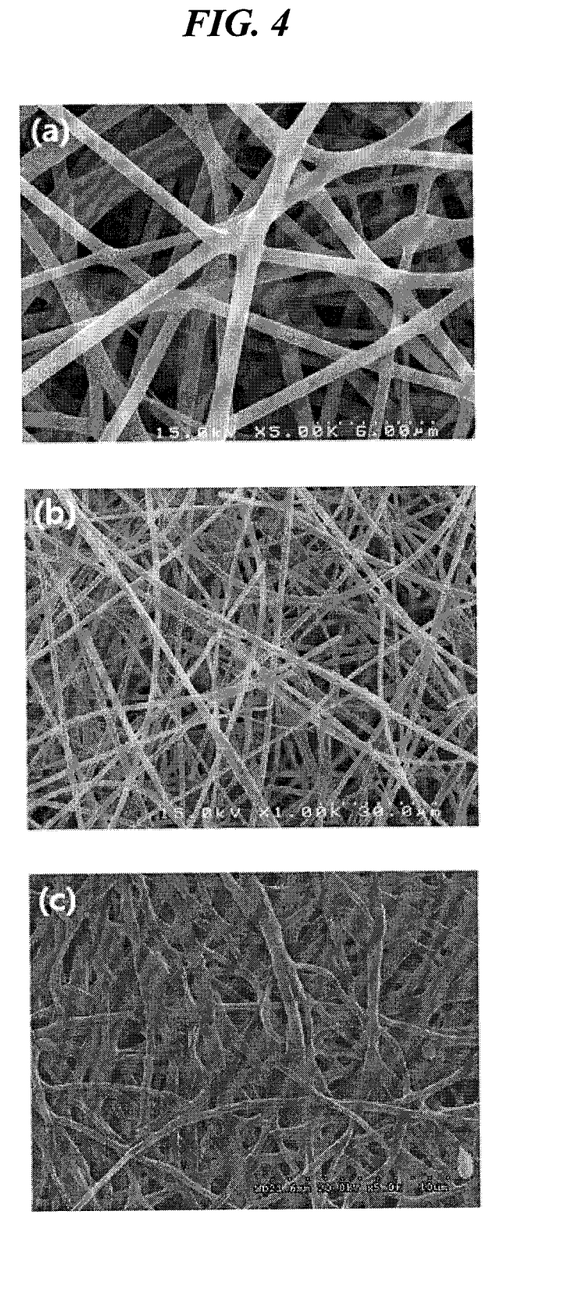
FIG. 4 is TEM images of ultrafine fibrous metal oxide porous bodies of Examples 1-1, 1-2 and 1-3, including (a) $SiO_2$, (b) $Al_2O_3$, and (c) polymer resin-impregnated $SiO_2$ ultrafine fibrous porous body, respectively.

A mixture solution comprising 20.8 g of tetraethoxyorthosilicate (TEOS), 9.2 g of ethylalcohol, 3.5 g of water and 0.1 g of an aqueous hydrochloric acid solution was stirred at about 70° C. for about 3 hours, thus preparing a TEOS sol-gel solution, which was then electrospun using a 30G spinning nozzle at a delivery rate of 20 µl/min under a high-voltage electric field of 20 kV by means of the electrospinning device of FIG. 1, thus manufacturing silica ultrafine fibrous porous body. The porous body was sintered at about 400° C. to obtain a porous body comprising silica ultrafine fibers having an average diameter of 680 nm. The TEM image of the silica ultrafine fibers is shown in (a) of FIG. 4.

Example 1-2

7 g of aluminum isopropoxide, 40 ml of ethylalcohol, ml of water and 25 ml of aqueous hydrochloric acid solution were mixed and stirred thus preparing an aluminum isopropoxide sol-gel solution. This solution was added with a solution of 5 ml of ethylalcohol and 1.5 g of PVP and stirred at about 70° C. for 2 hours thus preparing a mixture solution. This solution was electrospun using a 24G spinning nozzle under a high-voltage electric field of 15.5 kV at a delivery rate of 30 µl/min by means of the electrospinning device of FIG. 1, thus manufacturing an alumina/PVP ultrafine fibrous porous body. The porous body was sintered at about 500° C. to remove PVP therefrom, to obtain a porous body comprising alumina ultrafine fibers having an average diameter of 600 nm. The TEM image of the alumina ultrafine fibers is shown in (b) of FIG. 4.

Example 1-3

The ultrafine fibrous silica porous body of Example 1-1 was impregnated in a DMF solution having PVdF and polyetherimide (1:1 weight ratio) dissolved in a 5% weight ratio therein, dried, and then heat compressed at about 150° C., thus manufacturing a composite separator having a porosity of 65%. The TEM image of the separator is shown in (c) of FIG. 4. This separator was stored in an oven at 200° C. for about 1 hour and then the heat shrinkage rate thereof was measured to be about 4.3%. The results of evaluating heat resistance properties using TMA showed that the separator did not break down due to melting up to about 300° C. and thus exhibited high heat stability.

Example 2-1

Figure 5:
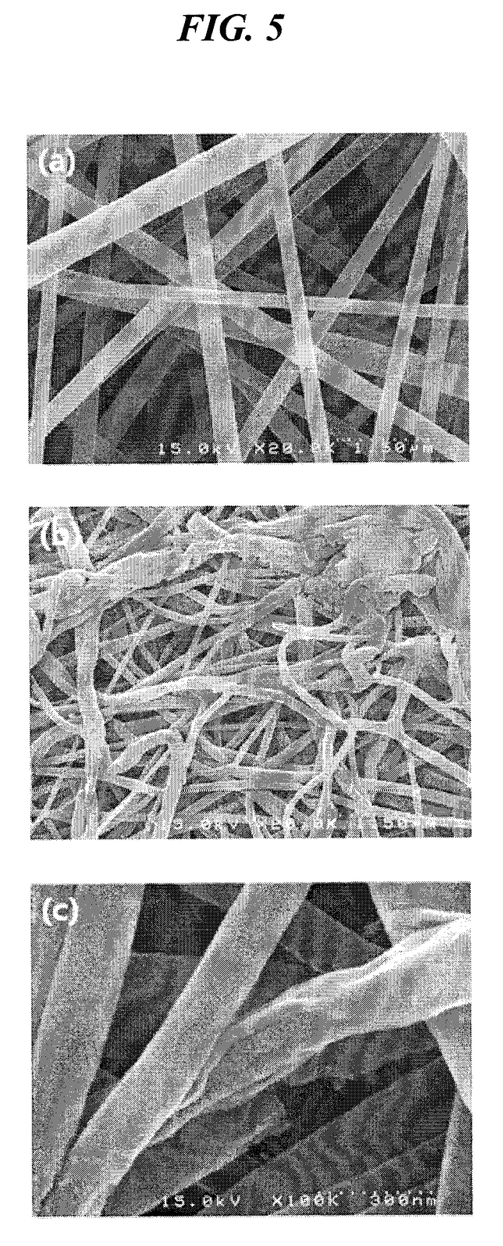
FIG. 5 describes TEM images of an ultrafine fibrous $SiO_2$/PVdF (1:1 weight ratio) heat-resistant composite separator of Example 2-1 (a) before heat compression, (b) after heat compression, and (c) after extraction of the PVdF component using a solvent, respectively.

A mixture solution comprising 113 g of TEOS, 50 g of ethylalcohol, 19 g of water and 0.56 g of an aqueous hydrochloric acid solution was reacted, thus preparing a TEOS sol-gel solution. A portion of the mixture solution was mixed with a solution of 3.5 g of PVdF (Kynar 761) and 21.5 g of DMF, and stirred at about 50° C., thus preparing a 14 wt % $SiO_2$/PVdF (1:1 weight ratio) mixture solution. This mixture solution was electrospun using the electrospinning device of FIG. 1 (a solution temperature of 50° C., a high-voltage electric field of 13.8 kV, a 27G spinning nozzle, a solution delivery rate of 27 µl/min), to obtain a silica/PVdF ultrafine fibrous porous body having an average fiber diameter of 262 nm and a porosity of 90%. The TEM image of the ultrafine fibrous porous body is shown in (a) of FIG. 5 (before heat compression).

In addition, in order to improve mechanical properties thereof and ensure a porosity of 60% and 75%, the resulting porous body was subjected to heat compression at about 140° C., heat stretching at 150° C. and heat treatment at 150° C. for about 30 min, to obtain a silica/PVdF heat-resistant composite separator. The TEM image thereof is shown in (b) of FIG. 5 (after heat compression).

In addition, the heat-resistant composite separator was treated with acetone thus extracting the PVdF therefrom. The TEM image of the silica ultrafine fibers thus obtained is shown in (c) of FIG. 5. Compared to when using the metal oxide nanoparticles of Comparative Example 1, the ultrafine silica was uniformly distributed in the surface of the fibers. This is considered to be because the silica component and the PVdF component were very uniformly distributed in the surface of the silica/PVdF composite ultrafine fibers, from which superior heat resistance and mechanical properties can be expected.

Similarly, a mixture solution of a $Ti(OBu)_4$ sol-gel solution and PVdF was electrospun, thus obtaining an ultrafine fibrous separator which was then heat treated at 180° C. for about 10 min, to obtain a $TiO_2$/PVdF heat-resistant ultrafine composite separator. This heat-resistant separator was stored in an oven at 150~250° C. for about 1 hour, and the heat shrinkage rate thereof was then measured to be less than about 1.5%.

Figure 6:
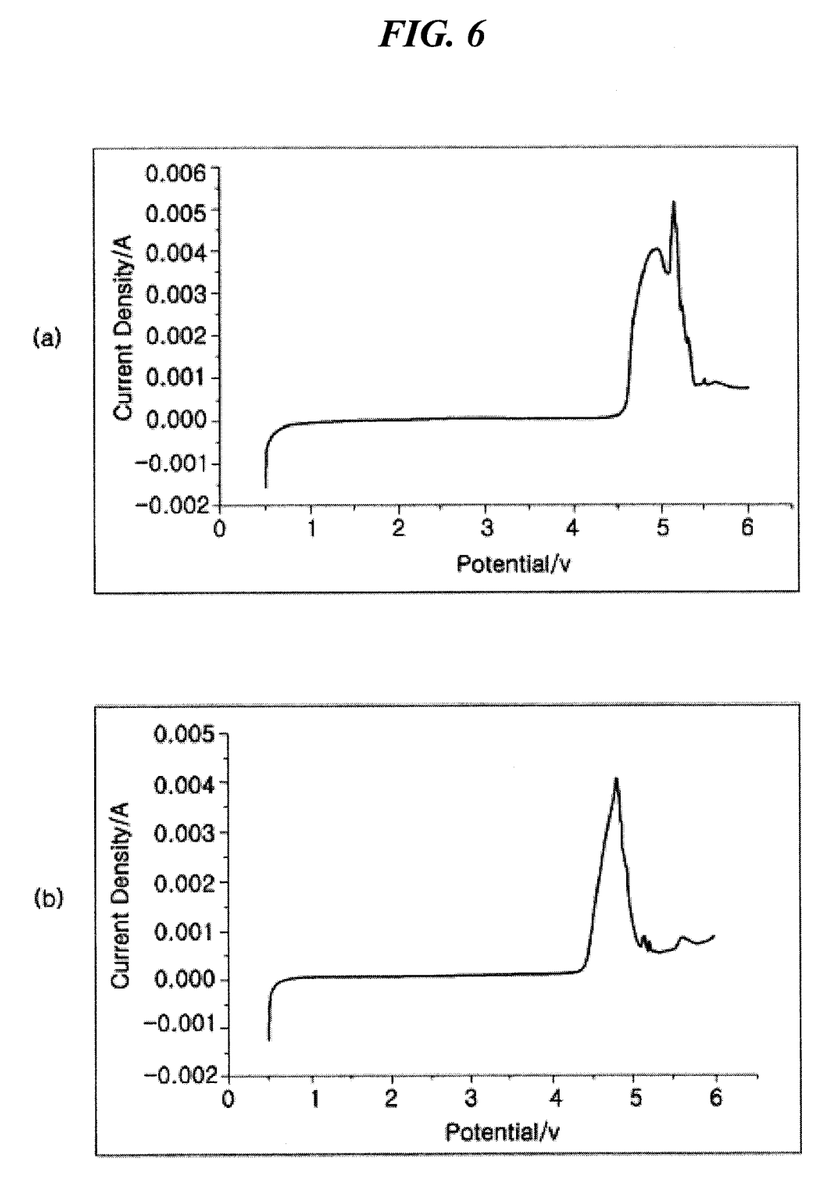
FIG. 6 illustrates results of measuring electrochemical stability of the ultrafine fibrous heat-resistant composite separators of Example 2-1, including (a) $SiO_2$/PVdF (1:1 weight ratio) and (b) $TiO_2$/PVdF (1:1 weight ratio), respectively.
Figure 7:
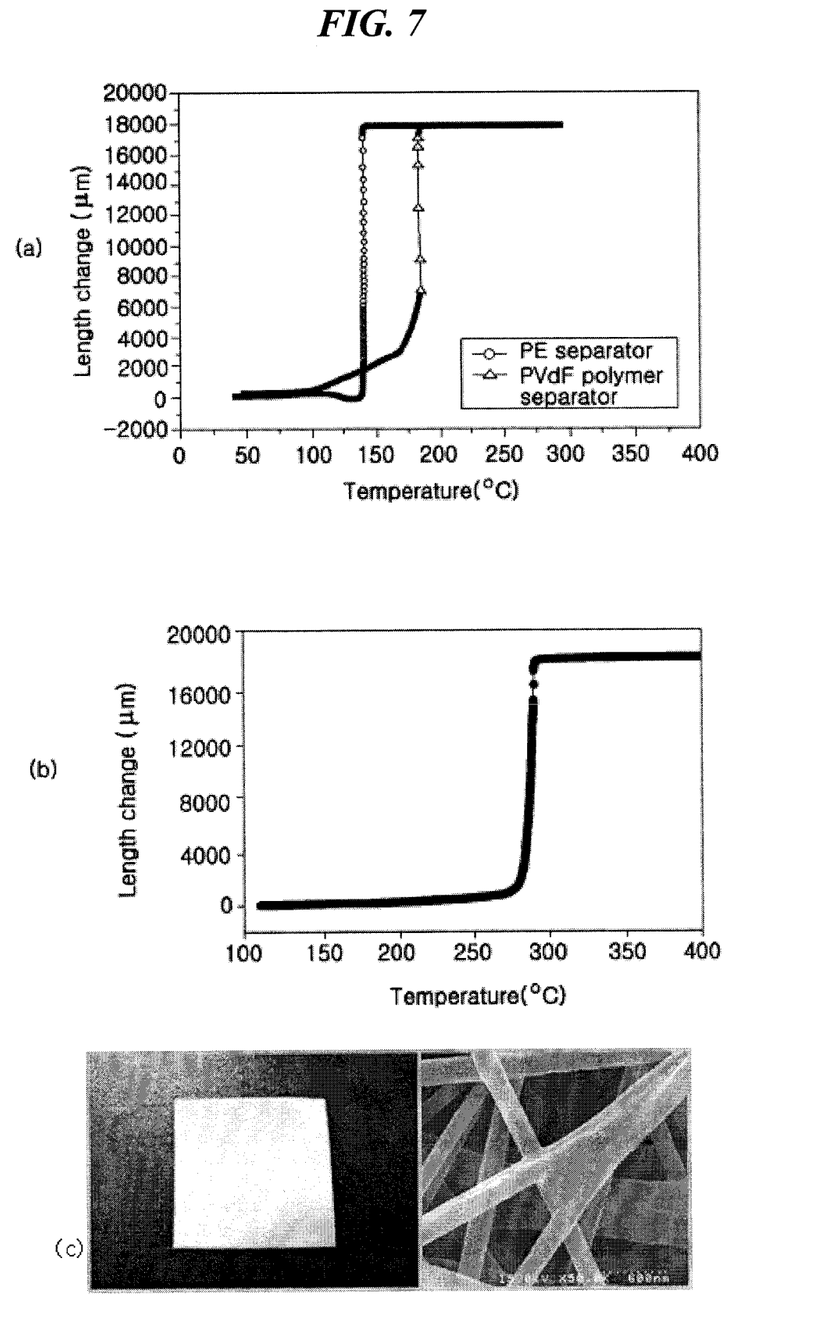
FIG. 7 shows TMA results (high temperature melt integrity) of the heat-resistant composite separators of Example 2-1, including (a) the PE separator/the PVdF ultrafine fibrous separator, (b) the ultrafine fibrous $SiO_2$/PVdF (1:1 weight ratio), and (c) the ultrafine fibrous $SiO_2$/PVdF (1:1 weight ratio) separator after kept at 250° C. for about 1 hour, respectively.

As shown in (a) and (b) of FIG. 6, the heat-resistant composite separators exhibited superior electrochemical stability of 4.5 V or more ((a) shows $SiO_2$/PVdF (1:1 weight ratio) and (b) shows $TiO_2$/PVdF (1:1 weight ratio)). Upon evaluation of heat resistance (high temperature melt integrity) using TMA, a commercial polyethylene (PE)-based separator and an ultrafine fibrous PVdF separator obtained by electrospinning only the PVdF solution rapidly extended and broke down due to the melting of the polymer from near the melting points of PE and PVdF, as shown in (a) of FIG. 7. However, the silica/PVdF ultrafine fibrous separator did not break down due to the melting of PVdF even at a temperature equal to or higher than 200° C., and thus exhibited superior heat resistance, as shown in (b) of FIG. 7. Furthermore, as shown in (c) of FIG. 7, even when the silica/PVdF ultrafine fibrous separator was allowed to stand at 250° C. for about 1 hour, the PVdF was partially melted and dissolved out, but the separator did not break down due to the melting, thus ensuring superior dimensional stability.

Figure 8:
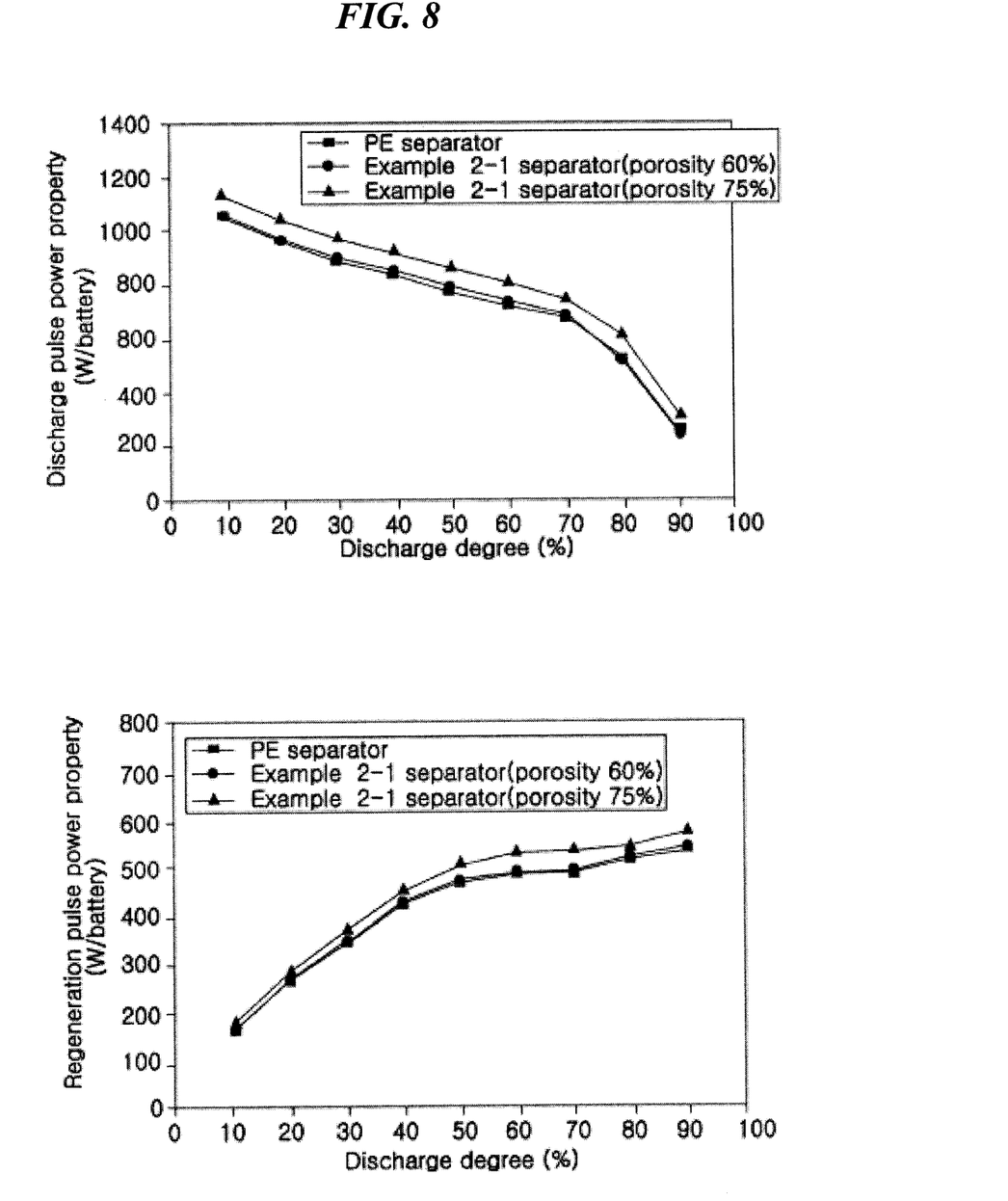
FIG. 8 is a graph of power properties of the $SiO_2$/PVdF (1:1 weight ratio) heat-resistant composite separator of Example 2-1.

As shown in FIG. 8, compared to the commercial PE separator having a porosity of 60%, the silica/PVdF composite separator having a porosity of 60% showed about a 2% increase in a power property, and the silica/PVdF composite separator having a porosity of 75% exhibited about an 8% increase in a power property.

Figure 9:
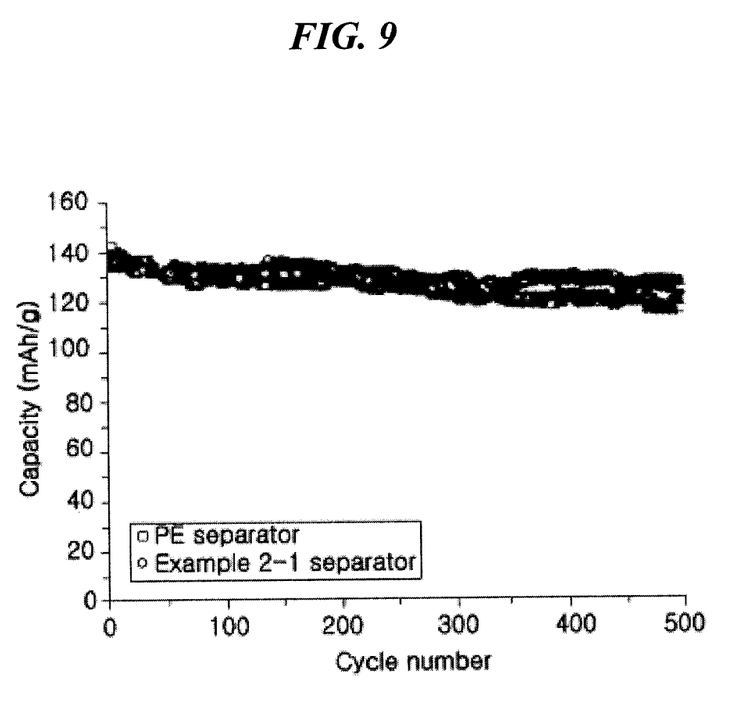
FIG. 9 is a graph of charge-discharge properties of the $SiO_2$/PVdF (1:1 weight ratio) heat-resistant composite separator of Example 2-1.

Respective cells were manufactured using the commercial PE separator having a porosity of 60% and the silica/PVdF composite separator having a porosity of 60%. 500-cycle charge-discharge tests were performed on the respective cells. As shown in FIG. 9, the PE separator maintained 83% of its initial capacity, whereas the silica/PVdF composite separator maintained 86% of its initial capacity.

Example 2-2

A mixture solution comprising 113 g of TEOS, 50 g of ethylalcohol, 19 g of water and 0.56 g of an aqueous hydrochloric acid solution was reacted, thus preparing a TEOS sol-gel solution. A portion of the mixture solution was mixed with a solution of 7.62 g of PVdF (Kynar 761) and 21 g of DMF, and stirred at about 50° C., thus preparing a 16 wt % $SiO_2$/PVdF (1:1 weight ratio) mixture solution. This mixture solution was electrospun using the electrospinning device of FIG. 1 (a solution temperature of 70° C., a high-voltage electric field of 18 kV, a 27G spinning nozzle, a solution delivery rate of 20 µl/min), to obtain a silica/PVdF ultrafine fibrous porous body having a porosity of 88%. In addition, the resulting porous body was subjected to heat compression, heat stretching at 150° C. and heat treatment for about 30 min, to obtain a heat-resistant separator having a porosity of 60%. This heat-resistant separator was stored in an oven at 200° C. for about 1 hour, and the heat shrinkage rate thereof was then measured to be less than about 3.0%. Compared to the commercial PE separator having a porosity of 60%, the resulting separator showed about a 2% increase in a power property.

Example 2-3

A mixture solution comprising 113 g of TEOS, 50 g of ethylalcohol, 19 g of water and 0.56 g of an aqueous hydrochloric acid solution was reacted, thus preparing a TEOS sol-gel solution. A portion of the mixture solution was mixed with a solution of 4 g of PVdF (Kynar 761) and 21 g of DMF, and stirred at about 60° C., thus preparing a 16 wt % $SiO_2$/PVdF (6:4 weight ratio) mixture solution. This mixture solution was electrospun using the electrospinning device of FIG. 1 (a solution temperature of 70° C., a high-voltage electric field of 16 kV, a 27G spinning nozzle, a solution delivery rate of 30 µl/min), to obtain a silica/PVdF ultrafine fibrous porous body having a porosity of 90%. In addition, the resulting porous body was subjected to heat compression, heat stretching at 150° C. and heat treatment for about 30 min, to obtain a heat-resistant separator having a porosity of 65%. This heat-resistant separator was stored in an oven at 200° C. for about 1 hour, and the heat shrinkage rate thereof was then measured to be less than about 2.5%. Compared to the commercial PE separator having a porosity of 60%, the resulting separator showed about a 2.1% increase in a power property.

Example 2-4

A mixture solution comprising 113 g of TEOS, 50 g of ethylalcohol, 19 g of water and 0.56 g of an aqueous hydrochloric acid solution was reacted, thus preparing a TEOS sol-gel solution. A portion of the mixture solution was mixed with a solution of 3.81 g of PVdF (Kynar 761), 3.81 g of silica nanoparticles and 21 g of DMF, and stirred at about 50° C., thus preparing a 16 wt % $SiO_2$/PVdF (1:1 weight ratio) mixture solution. This mixture solution was electrospun using the electrospinning device of FIG. 1 (a solution temperature of 70° C., a high-voltage electric field of 18 kV, a 27G spinning nozzle, a solution delivery rate of 20 µl/min), to obtain a silica/PVdF ultrafine fibrous porous body having a porosity of 88%. In addition, the resulting porous body was subjected to heat compression, heat stretching at 150° C. and heat treatment for about 30 min, to obtain a heat-resistant separator having a porosity of 60%. This heat-resistant separator was more flexible than the separator prepared in Example 2-2. The heat-resistant separator was stored in an oven at 200° C. for about 1 hour, and the heat shrinkage rate thereof was then measured to be less than about 5.5%. Compared to the commercial PE separator having a porosity of 60%, the resulting separator showed about a 2.0% increase in a power property.

What is claimed is:

1. An ultrafine fiber-based composite separator comprising a fibrous porous body which comprises ultrafine metal oxide/polymer composite fibers, or ultrafine metal oxide fibers and a polymer resin coating layer formed on the surface thereof, the ultrafine fibers being continuously randomly arranged and layered, and obtained by electrospinning a homogenous mixture of a metal oxide precursor sol-gel solution and a polymer resin solution, wherein the surface of the metal oxide/polymer composite fibers has a uniform mixing composition of the metal oxide and the polymer resin, in which the separator has a heat shrinkage rate at 150~250° C. of 10% or less and does not break down due to melting at a temperature of 200° C. or lower, and wherein the polymer resin solution comprises a polymer resin that swells in an electrolyte solution and/or a polymer resin that has a melting point of 180° C. or higher or is amorphous, or is a mixture thereof.

2. The ultrafine fiber-based composite separator of claim 1, wherein the porous body having a polymer resin coating layer is obtained by sintering at 300~1000° C. a fibrous porous body resulting from electrospinning the metal oxide precursor sol-gel solution or the mixture of metal oxide precursor sol-gel solution and polymer resin solution (a first polymer resin solution), followed by impregnation or coating with a second polymer resin solution.

3. The ultrafine fiber-based composite separator of claim 1, wherein the polymer resin that swells in an electrolyte solution is selected from the group consisting of polyvinylidene fluoride, poly(vinylidenefluoride-co-hexafluoropropylene), perfluoropolymers, perfluoropolymer copolymers, polyethyleneglycol dialkylether, polyethyleneglycol dialkylester, polyethylene oxide, polypropylene oxide, polyacrylonitrile, polyacrylonitrile methylmethacrylate copolymers, polyurethanes, polymethylmethacrylate, polymethylmethacrylate copolymers, and a mixture thereof.

4. The ultrafine fiber-based composite separator of claim 1, wherein the polymer resin that has a melting point of 180° C. or higher or is amorphous is selected from the group consisting of polyamides, polyimides, polyamideimides, poly(metaphenyleneisophthalamide), polysulfones, polyethersulfones, polyphenylenesulfones, polyetherketones, polyetherimides, polyethyleneterephthalate, polytrimethyleneterephthalate, polyethylenenaphthalate, polytetrafluoroethylene, polyurethanes, polyurethane copolymers, and a mixture thereof.

5. The ultrafine fiber-based composite separator of claim 2, wherein the first polymer resin solution comprises a polymer resin selected from the group consisting of polyvinylpyrrolidone, polyvinylalcohol, polyvinylacetate, polyethylene oxide, and a mixture thereof.

6. The ultrafine fiber-based composite separator of claim 2, wherein the second polymer resin solution comprises a polymer resin that swells in an electrolyte solution, and/or polymer resin that has a melting point of 180° C. or higher or is amorphous, or a mixture thereof.

7. The ultrafine fiber-based composite separator of claim 1, wherein the metal oxide of the porous body is selected from the group consisting of silica ($SiO_2$), alumina ($Al_2O_3$), boehmite, $ZnO_2$, $LiAlO_2$, $TiO_2$, $BaTiO_3$, $LiTiO_3$ and a mixture thereof.

8. The ultrafine fiber-based composite separator of claim 1, wherein the ultrafine metal oxide/polymer composite fibers contain the metal oxide in an amount ranging from 5 to 80 wt %.

9. The ultrafine fiber-based composite separator of claim 1, wherein the metal oxide precursor sol-gel solution further comprises nanoparticles of metal oxide selected from the group consisting of silica ($SiO_2$), alumina ($Al_2O_3$), boehmite, $ZnO_2$, $LiAlO_2$, $TiO_2$, $BaTiO_3$, and a mixture thereof in an amount of 0.1~200 wt % based on the weight of the metal oxide obtained from the metal oxide precursor sol-gel solution.

10. The ultrafine fiber-based composite separator of claim 1, wherein the porous body further comprises a binder dispersed between the ultrafine fibers.

11. The ultrafine fiber-based composite separator of claim 1, wherein the porous body is produced by heat compression; heat compression and then heat stretching; or a series of heat compression, heat stretching and then further heat compression, the heat compression being conducted at a temperature equal to or higher than the glass transition temperature ($T_g$) of polymer resin but equal to or lower than the melting point ($T_m$) thereof.

12. The ultrafine fiber-based composite separator of claim 11, wherein the porous body is subjected to heat treatment at 100~250° C. after the heat compression or the heat stretching.

13. The ultrafine fiber-based composite separator of claim 1, wherein said electrospinning is melt-blowing, flash spinning, or electro-blowing.

14. The ultrafine fiber-based composite separator of claim 1, wherein said electrospinning is carried out at a temperature ranging from room temperature to 150° C.

15. The ultrafine fiber-based composite separator of claim 1, wherein the ultrafine fibers have a diameter ranging from 1 to 3000 nm.

16. The ultrafine fiber-based composite separator of claim 11, wherein the separator has a porosity ranging from 40 to 75%.

17. A secondary battery comprising a cathode, an anode, and the ultrafine fiber-based composite separator of claim 1 and an electrolyte disposed between the two electrodes.

* * * * *